United States Patent
Long

(10) Patent No.: US 9,332,406 B2
(45) Date of Patent: May 3, 2016

(54) METHOD, APPARATUS, AND SYSTEM FOR UPDATING CONTACT INFORMATION

(71) Applicant: TENCENT TECHNOLOGY (SHENZHEN) COMPANY LIMITED, Shenzhen (CN)

(72) Inventor: Jiejun Long, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/659,729

(22) Filed: Mar. 17, 2015

(65) Prior Publication Data

US 2015/0189484 A1 Jul. 2, 2015

Related U.S. Application Data

(63) Continuation of application No. PCT/CN2014/075351, filed on Apr. 15, 2014.

(30) Foreign Application Priority Data

Apr. 24, 2013 (CN) .......................... 2013 1 0143774

(51) Int. Cl.
*H04W 4/14* (2009.01)
*H04M 1/2745* (2006.01)
*H04M 1/725* (2006.01)
*H04W 8/18* (2009.01)

(52) U.S. Cl.
CPC .......... *H04W 4/14* (2013.01); *H04M 1/274516* (2013.01); *H04M 1/274533* (2013.01); *H04M 1/72552* (2013.01); *H04W 8/183* (2013.01)

(58) Field of Classification Search
CPC ....... H04W 8/245; H04W 8/265; H04W 4/14; H04W 8/183; H04M 1/72525; H04M 2207/18; H04M 3/42178; H04M 1/274516; H04M 1/274533; H04M 1/72552
See application file for complete search history.

(56) References Cited

U.S. PATENT DOCUMENTS

| 2011/0129073 A1* | 6/2011 | Chaudhuri ........ H04M 3/42153 379/88.16 |
| 2011/0131219 A1* | 6/2011 | Martin-Cocher . H04L 29/12047 707/754 |
| 2014/0013446 A1* | 1/2014 | Patvarczki .............. H04L 67/24 726/28 |

FOREIGN PATENT DOCUMENTS

| CN | 101867636 A | 10/2010 |
| CN | 102202010 A | 9/2011 |
| CN | 102868801 A | 1/2013 |
| CN | 103218363 A | 7/2013 |

OTHER PUBLICATIONS

International Search Report for Application No. PCT/CN2014/075351 dated Jul. 22, 2014.

* cited by examiner

*Primary Examiner* — Ted Wang
(74) *Attorney, Agent, or Firm* — Harness, Dickey & Pierce, P.L.C.

(57) ABSTRACT

A communication connection is established with an information sending terminal. A short message sent from the information sending terminal is received. The short message is displayed on a display page. The short message is analyzed to identify whether a contact information field is in the short message by using a contact information determination condition. The contact information field is extracted from the short message when an identification result shows that the contact information field is in the short message. A box is displayed on the display page on which the short message is displayed to prompt a user to make a selection from function items to process the contact information field. The address book of the terminal device is updated by using the contact information field based on a function item selected by the user.

20 Claims, 6 Drawing Sheets

METHOD, APPARATUS, AND SYSTEM FOR UPDATING CONTACT INFORMATION

CROSS-REFERENCE TO RELATED APPLICATIONS

This application is a continuation of International Application No. PCT/CN2014/075351 filed on Apr. 15, 2014. This application claims the benefit and priority of Chinese Application No. 201310143774.5, filed on Apr. 24, 2013. The entire disclosures of each of the above applications are incorporated herein by reference.

FIELD

The present disclosure relates to a method, apparatus, and system for updating contact information.

BACKGROUND

This section provides background information related to the present disclosure which is not necessarily prior art.

The purpose of communication is to transmit information. Information is reflection of objective substance movements or subjective mind activity states, and it can be described in various ways such as languages, words, images, data, etc. To deliver (transmit and interchange) information at an information source end, original information is transformed into electric signals, and then the electric signals are transformed into transmission signals that meet transmission and interchanging requirements in the communication network. At an information sink end, an inverse transform needs to be performed to restore the original information. The kinds of apparatuses that carry out the above transform and inverse transform of the original information over the communication network are called terminal devices. As a direct tool for people to enjoy communication services, a terminal provides good interfaces and carries out tasks such as service functions needed by the user, accessing communication networks, etc.

Contact information is information related to personal natural properties of a user, and generally includes the user's home address, work unit, e-mail address, mobile phone number, fixed telephone number, instant messenger ID, etc.

In the traditional art, when the contact information of a contact of a user (e.g., the contact's telephone number) changes, the contact may send a short message to the user to inform the user of his new contact information. When the user receives the short message, he can only update the address book by manually extracting the contact information. During the process, the user needs to manually extract the contact information and thus, the operation is complicated, easily executed incorrectly, and the information processing efficiency is low.

SUMMARY

This section provides a general summary of the disclosure, and is not a comprehensive disclosure of its full scope or all of its features.

Additional features and advantages of the present disclosure will be set forth in the description which follows, and in part will be apparent from the description, or can be learned by practice of the herein disclosed principles.

The present disclosure provides a method for updating contact information in an address book implemented on a terminal device, the terminal device including one or more processors and a storage device on which one or more program modules are stored, the one or more program modules being executable by the one or more processors. The method includes:

establishing a communication connection with an information sending terminal;

receiving a short message sent from the information sending terminal;

displaying the short message on a display page provided by the terminal device;

analyzing the short message to identify whether a contact information field is in the short message by using a contact information determination condition;

extracting the contact information field from the short message when an identification result shows that the contact information field is in the short message;

displaying a box on the display page on which the short message is displayed to prompt a user of the terminal device to make a selection from function items to process the contact information field; and updating the address book of the terminal device by using the contact information field based on a function item selected by the user.

The present disclosure provides an apparatus for updating contact information, including memory, one or more processors, and one or more programs stored in the memory and configured for execution by the one or more processors, the one or more programs including instructions to:

establish a communication connection with an information sending terminal;

receive a short message sent from the information sending terminal;

display the short message on a display page provided by the apparatus;

analyze the short message to identify whether a contact information field is in the short message by using a contact information determination condition;

extract the contact information field from the short message when an identification result shows that the contact information field is in the short message;

display a box on the display page on which the short message is displayed to prompt a user of the apparatus to make a selection from function items to process the contact information field; and update the address book of the apparatus by using the contact information field based on a function item selected by the user.

The present disclosure provides a system for updating contact information, including an information sending terminal and an information receiving terminal. The information sending terminal is to send a short message; and the information receiving terminal is to:

establish a communication connection with the information sending terminal;

receive the short message sent from the information sending terminal;

display the short message on a display page;

analyze the short message to identify whether a contact information field is in the short message by using a contact information determination condition;

extract the contact information field from the short message when an identification result shows that the contact information field is in the short message;

display a box on the display page on which the short message is displayed to prompt a user of the information receiving terminal to make a selection from function items to process the contact information field; and update the address book of the information receiving terminal by using the contact information field based on a function item selected by the user.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

For a better understanding of the present disclosure, reference should be made to the Detailed Description below, in conjunction with the following drawings in which like reference numerals refer to corresponding parts throughout the figures.

Corresponding reference numerals indicate corresponding parts throughout the several views of the drawings.

DETAILED DESCRIPTION

Example embodiments will now be described more fully with reference to the accompanying drawings. To make the technical scheme and advantages of the present disclosure clearer and easy to understand, the present disclosure will be described in detail in combination with drawings in the following.

Figure 1:
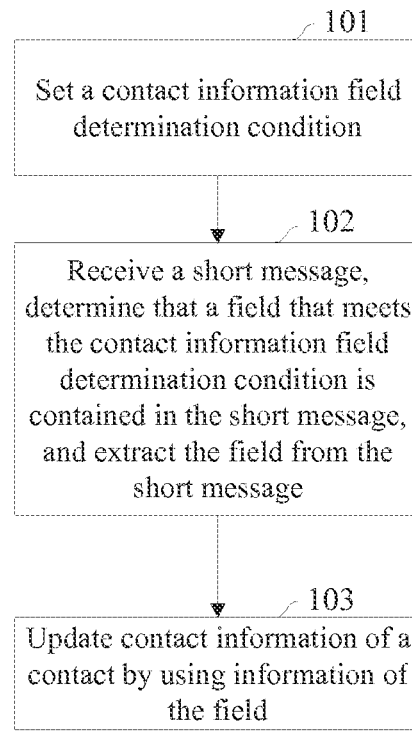
FIG. 1 shows a flowchart of a method for updating contact information according to various embodiments of the present disclosure.

FIG. 1 shows a flowchart of a method for updating contact information according to various embodiments of the present disclosure.

As shown in FIG. 1, the method includes the following process.

Block 101: a contact information field determination condition is set. The contact information field determination condition is set on an information receiving terminal. The information receiving terminal refers to an input device and/or an output device that has communication functions. The contact information refers to personal natural property information of a user, and generally, it refers to the user's home address, work unit, e-mail address, mobile phone number, fixed telephone number, instant messenger ID, etc. Based on actual implementations and needs, the specific content of the contact information can be changed accordingly. For example, the information receiving terminal may include, but is not limited to, feature phone, intelligent mobile phone, palm PC, PC, tablet computer, personal digital assistant (PDA), etc. if it is determined that a field in a short message meets the contact information field determination condition, then it can be confirmed that the short message contains contact information to be updated, so that corresponding contact information updating operation can be triggered.

In various embodiments, setting the contact information field determination condition specifically includes setting an e-mail address determination condition. The format of an e-mail address may be formed of three parts. The first part, "USER", represents the account of the user's mail box and, for an incoming mail server, the account must be unique. The second part, "@", is a separator. The third part is the incoming mail server domain of the user's mail box, used to indicate the location where the mail box is located. The e-mail address determination condition can be confirmed based on these three parts.

In various embodiments, setting the contact information field determination condition specifically includes setting a mobile phone number determination condition. Generally, a mobile phone number has a fixed length and a number segment, so the mobile phone number determination condition can be decided according to the length and the number segment. For example, generally a mobile phone number in China has 11 digits. The first three digits are a fixed number segment, e.g., 134, 135, 136, 137, 138, 139, 158, 159, 188, etc. Therefore, the mobile phone number determination condition can be determined based on the length being 11 digits and the fixed number segments. When the length of a number is 11 digits and the first three digits of the number are one of the preconfigured fixed number segments, then it can be deemed that the number is a mobile phone number. Though, the length of the number is 11 digits and the fixed number segment of the number being 3 digits is taken as an example to illustrate the present disclosure, those skilled in the art may be aware that the example is made for illustration only and is not to limit the protecting scope of the present disclosure.

In various embodiments, setting the contact information field determination condition specifically may include setting a fixed telephone number determination condition. A fixed telephone number has a fixed length and an area code. The fixed telephone number determination condition can be determined based on the length and the area code of the number. As an example, generally a fixed telephone number in China consists of 8 digits or 7 digits, and an area code contained in it may be 010 (Beijing), 021 (Shanghai), 022 (Tianjin), 023 (Chongqing), etc. Therefore, the fixed telephone number determination condition can be determined according to the length being 8 digits or 7 digits and the area code. When the length of a certain number is 8 digits and the number contains one of the above preconfigured area codes, it can be deemed that the number is a fixed telephone number. Though, the example is made by taking the length of the fixed telephone number being 8 digits or 7 digits and the area code in the number being 3 digits as an example, those skilled in the art may be aware that the above example is just made for illustration and should not be construed as any limitations to the protecting scope of the present disclosure.

In various embodiments, setting the contact information field determination condition specifically may include setting an instant messenger number determination condition. The instant messenger number determination condition can be set based on the length of a number and a keyword. Taking an instant messenger number of an application "AA" as an example the length of instant messenger numbers is limited. Therefore, the instant messenger number determination condition can be determined based on the preconfigured length limitation and the keyword (e.g., AA). When the length of a number is 8 digits and the keyword AA is contained, it can be deemed that the number is an instant messenger number.

Block 102: a short message is received and analyzed. When it is determined that the short message contains a field meeting the contact information field determination condition, the field is extracted from the short message.

In various embodiments, when an e-mail address determination condition is set at block 101 and it is determined that a field meeting the e-mail address determination condition is contained in the short message based on the e-mail address determination condition, the e-mail address is extracted from the short message.

In various embodiments, when a mobile phone number determination condition is set at block 101 and it is determined that a field meeting the mobile phone number determination condition is contained in the short message based on the mobile phone number determination condition, the mobile phone number is extracted from the short message.

In various embodiments, when a fixed telephone number determination condition is set at block 101 and it is determined that a field meeting the fixed telephone number determination condition is contained in the short message based on the fixed telephone number determination condition, the fixed telephone number is extracted from the short message.

In various embodiments, when an instant messenger number determination condition is set at block 101 and it is determined that a field meeting the instant messenger number determination condition is contained in the short message based on the instant messenger number determination condition, the instant messenger number is extracted from the short message.

Though various examples of contact information are described above, one skilled in the art may be aware that the present disclosure should not be limited to these examples, but can be applicable to other contact information, which will not be elaborated herein.

Block 103: the field is used to update contact information of a contact. In this block, when the contact information field is obtained, the contact information of a short message sender in an address book can be changed according to the contact information field, or a new contact may be established in the address book and the contact information is added to a corresponding contact information field of the newly added contact.

In various embodiments, when an e-mail address determination condition is set at block 101, a new contact may be established in the address book and the e-mail address may be added to the contact information of the newly added contact, or contact information of a short message sender in the address book may be updated according to the e-mail address.

In various embodiments, when a mobile phone number determination condition is set at block 101, a new contact may be established in the address book and the mobile phone number may be added to the contact information of the newly added contact, or contact information of a short message sender in the address book may be updated according to the mobile phone number.

In various embodiments, when a fixed telephone number determination condition is set at block 101, a new contact may be established in the address book and the fixed telephone number may be added to the contact information of the newly added contact, or contact information of a short message sender in the address book may be updated according to the fixed telephone number.

In various embodiments, when an instant messenger number determination condition is set at block 101, a new contact may be established in the address book and the instant messenger number may be added to the contact information of the newly added contact, or contact information of a short message sender in the address book may be updated according to the instant messenger number.

Though various examples of contact information are listed above, one skilled in the art may be aware that the implementation of the present disclosure should not be limited to these examples, but can be applicable to any contact information.

When the methods of the present disclosure are applied, a terminal may analyze information contained in a short message. When an analysis result of the short message shows that the short message contains a notification of contact information change, then the terminal may prompt the user to either extract the information to update contact information of a contact, add a new contact, or ignore the notification. After the user makes a confirmation, information in the address book may be automatically updated according to a short message so as to alleviate the workload of manually extracting and inputting the information.

In various embodiments, an application on the information receiving terminal may be used to monitor and analyze a received short message. In the case that the short message contains information in commonly used communication formats, such as email format, mobile phone number format, etc., a function item of number extraction will be shown on a display page of the short message. The user may select the function to update contact information of the current contact (i.e., the short message sender) or add contact information of a new contact to an address book.

In various embodiments, the contact information field determination condition may be stored in the information receiving terminal or may be stored in a third party device (e.g., a server). When the contact information field determination condition at the information receiving terminal is not consistent with the contact information field determination condition at the third party device, updating or not updating the contact information may be selected. When the contact information field determination conditions at the information receiving terminal and at the third party device are expected to be consistent, they may be kept consistent by a synchronization operation.

The synchronization operation may include the following process. The information receiving terminal sends a synchronization request to a third party device for synchronizing the contact information field determination conditions. Based on the synchronization request, the third party device synchronizes the contact information field determination condition stored with the contact information field determination condition stored by the information sending terminal.

The contact information field determination condition may be stored in the information receiving terminal or in the third party device. Similarly, the operation of analyzing the short message and determining whether a field meeting the contact information field determination condition is contained the short message may be performed by the information receiving terminal or by the third party device.

In various embodiments, the information sending terminal may determine the information processing capability of the information receiving terminal and automatically select a message channel according to the information processing capability of the information receiving terminal. For example, the information processing capability may include online state of the information receiving terminal, network condition of the information receiving terminal, self-state decided by the resource processing capability of the information receiving terminal, etc.

In various embodiments, prompt information may be provided for the user to select an information channel or select a corresponding information channel according to corresponding settings configured by the information sending terminal/server in advance. The corresponding settings of the information sending terminal/server may have a higher priority.

The various embodiments may be applied across platforms and/or across channels. These channels may include data channels and wireless channels. Channels that use GPRS, wifi, etc. to transmit information are data channels, e.g., twit-talk, voice, etc.; while channels that use wireless information channels to transmit information are wireless channels, e.g., SMS, etc.

The information receiving terminal may directly receive information from the information sending terminal through various modes of communication or indirectly receive information via a third party device. According to the relation between the information transmission direction and time, the modes of communication between the information receiving terminal and the information sending terminal/third party device may be categorized into simplex communication, half-duplex communication, and full-duplex communication, etc.

In the simplex communication, a simplex communication channel is a one-way channel, the IDs of the information sending terminal/third party device and the information receiving terminal are fixed, the information sending terminal/third party device only sends information but can't receive information. Specifically, the information receiving terminal only receives information, but does not sends information. The data signals are only transmitted from one end to the other end. The information flow is one-way.

In the half-duplex communication, two-way communication may be realized, but it can't be performed in two directions at the same time and it needs to be performed alternately. That is, each end of a communication channel may be a sending terminal or may be a receiving terminal. However, at the same time, there is only one direction for the information transmission. An example of this is commonly used walkie talkie, etc.

In the full-duplex communication, at any time of the communication, two-way signal transmissions exist on a communication line. In the full-duplex communication, data can be transmitted in two directions at the same time, so the full-duplex communication is also called two-way simultaneous communication. That is, two parties of communication can send and receive data at the same time. In the full-duplex communication, a transmitter and a receiver are set at each end of the communication system and therefore, data can be controlled to be transmitted in two directions. In the full-duplex transmission, it is not necessary to switch directions and therefore, there is no latency incurred by switch operations.

In various embodiments, the information receiving terminal may negotiate with the information sending terminal/third party device about detailed communication protocols. In these communication protocols, formats used by data units, information and meanings that should be contained in the data units, ways of connection, time sequence of sending and receiving information, etc. may be defined, so as to guarantee that data in a network can be smoothly transmitted to a specified destination.

For example, the communication protocols that are used in the present disclosure may include but are not limited to Transmission Control Protocol/Internet Protocol (TCP/IP), Hyper Text Transmission Protocol (HTTP), Simple Mail Transmission Protocol (SMTP), Post Office Protocol 3 (POP3), etc.

In various embodiments, the information receiving terminal may receive information via various communication standards. For example, Global System for Mobile (GSM), Wideband Code Division Multiple Access (WCDMA), Code Division Multiple Access 2000 (CDMA-2000), Time Division-Synchronous Code Division Multiple Access (TD-SCDMA), etc.

The format of the short message received by the information receiving terminal may have various formats. For example, the format may include but is not limited to: Short Message Service (SMS), e-mail, Instant Messaging (IM) information, Multimedia Messaging Service (MMS) or voice information, etc. Though some detailed formats of the short message are listed above, those skilled in the art may be aware that what listed is only for illustration but is not to limit the way of implementing the present disclosure.

In various embodiments, the information sending terminal may learn the online state of the information receiving terminal via a state inquiry server and select an information channel according to the online state of the information receiving terminal. When the information receiving terminal is off-line, the information sending terminal selects a wireless message channel to transmit the personal information, and when the information receiving terminal is on-line, the information sending terminal selects a data message channel to transmit the personal information.

Figure 2:
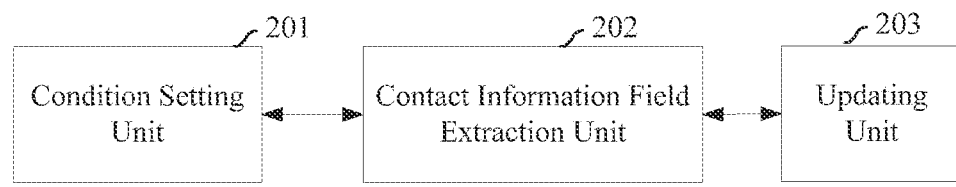
FIG. 2 shows the structure of an apparatus for updating contact information according to various embodiments.

Various embodiments also provide an apparatus for updating contact information. FIG. 2 depicts the structure of an apparatus for updating contact information according to various embodiments. As shown in FIG. 2, the apparatus includes a condition setting unit 201, a contact information field extraction unit 202, and an updating unit 203.

The condition setting unit 201 is configured to set a contact information field determination condition. The contact information field extraction unit 202 is configured to receive and analyze a short message. When the short message contains a field that meets the contact information field determination condition, the field is extracted from the short message; and the updating unit 203 is configured to use the field to update contact information of a contact.

In various embodiments, the contact information field extraction unit 202 is configured to receive the short messages via a data message channel or wireless message channel.

In various embodiments, the condition setting unit 201 is configured to set an e-mail address determination condition. The contact information field extraction unit 202 is configured to extract an e-mail address from a short message when it is determined that the short message contains a field that meets the e-mail address determination condition. The updating unit 203 is configured to establish a new contact in the address book and add the email address to contact information of the newly added contact, or contact information of the short message sender in the address book is updated according to the e-mail address.

In various embodiments, the condition setting unit 201 is configured to set a mobile phone number determination condition. The contact information field extraction unit 202 is configured to extract a mobile phone number from a short message when it is determined that the short message contains a field that meets the mobile phone number determination condition. The updating unit 203 is configured to establish a new contact in an address book and add the mobile phone number to contact information of the newly added contact, or contact information of the short message sender in the address book is updated according to the mobile phone number.

In various embodiments, the condition setting unit 201 is configured to set a fixed telephone number determination condition. The contact information field extraction unit 202 is configured to extract a fixed telephone number from a short message when it is determined that the short message contains a field that meets the fixed telephone number determination condition. The updating unit 203 is configured to establish a new contact in an address book and add the fixed telephone number to contact information of the newly added contact, or contact information of the short message sender in the address book is updated according to the fixed telephone number.

In various embodiments, the condition setting unit 201 is configured to set an instant messenger number determination condition. The contact information field extraction unit 202 is configured to extract an instant messenger number from a short message when it is determined that the short message contains a field that meets the instant messenger number determination condition. The updating unit 203 is configured to establish a new contact in an address book and add the instant messenger number to contact information of the newly added contact, or contact information of the short message sender in the address book is updated according to the instant messenger number.

Figure 3:
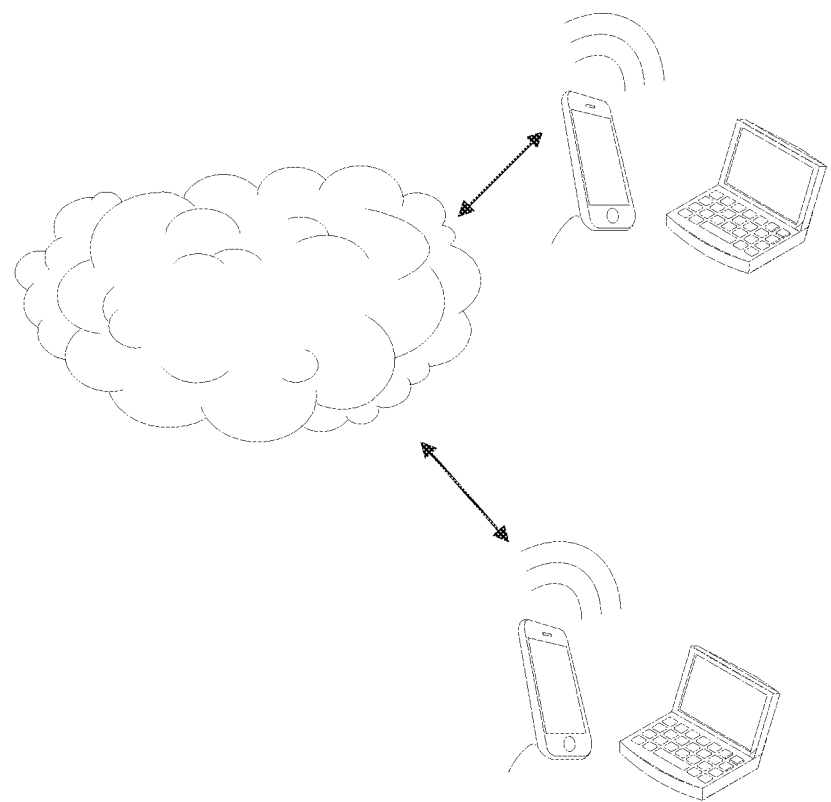
FIG. 3 shows the structure of a system for updating contact information according to various embodiments.

Various embodiments also provide a system for updating contact information. FIG. 3 shows a diagram of the contact information updating system according to various embodiments. As shown in FIG. 3, the system includes an information sending terminal 301 and an information receiving terminal 302. The information sending terminal 301 is configured to send a short message. The information receiving terminal 302 is configured to set a contact information field determination condition, receive and analyze the short message, and when it determines that the short message contains a field that meets the contact information field determination condition, it extracts the field from the short message and updates contact information of a contact by using the field.

In various embodiments, the information sending terminal 301 is configured to edit the short message, inquire an information processing capability of an information receiving terminal, automatically select an information channel according to the information processing capability of the information receiving terminal, and send the short message to the information receiving terminal according to the selected information channel.

In various embodiments, the information sending terminal 301 is configured to select the information channel according to an online state of the information receiving terminal, select the information channel according to a network state of the information receiving terminal, or select the information channel according to a self-state decided according to a resource processing capability of the information receiving terminal.

The system shown in FIG. 3 may be integrated into various communication networks. For example, the information receiving terminal or information sending terminal may include but is not limited to: a feature phone, an intelligent mobile phone, a palm PC, a PC, a tablet PC, a PDA, etc.

Figure 4:
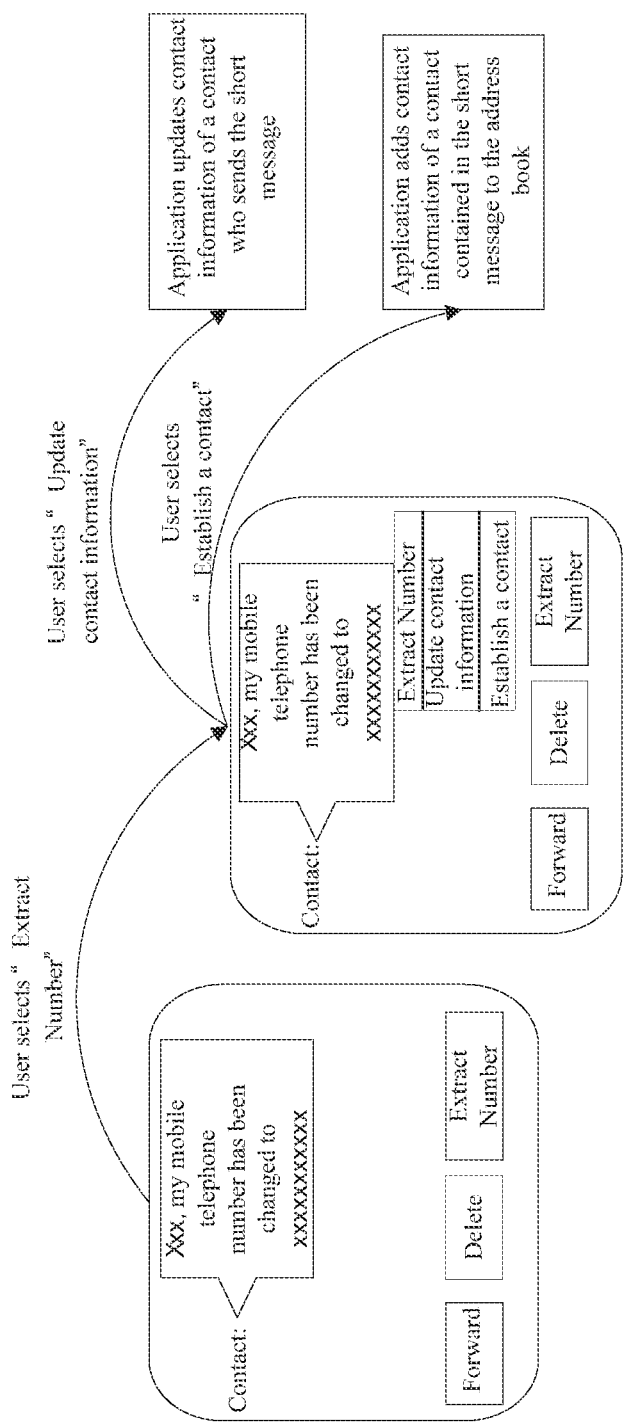
FIG. 4 shows a diagram of a procedure of updating contact information of a contact according to various embodiments.

FIG. 4 shows a diagram of a procedure for updating contact information of a contact according to various embodiments. As is seen from FIG. 4, when a user receives a short message, a number extraction function may be triggered according to the short message, contact information such as a mobile phone number or an e-mail address may be automatically extracted from the short message. Contact information of a contact who sends the short message may be updated according to the contact information, or the extracted contact information is added to an address book so as to improve the information processing efficiency.

One method for updating the contact information may be implemented in various ways. For example, by using application interfaces conforming to certain specifications, the method for updating the contact information may be programmed into plugin programs that are installed on the mobile terminal, or may be encapsulated into applications for the user to download and use. When it is programmed into the plugin programs, it can be implemented in various plugin forms such as ocx, dll, cab, etc. The method for updating the contact information proposed by the examples of the present disclosure may be implemented by Flash plugin, RealPlayer plugin, MMS plugin, MIDI stave plugin, ActiveX plugin, etc.

The method for updating contact information provided in the various embodiments may be stored in various storage media as instructions or instruction sets. The storage media include but are not limited to: floppy disk, disc, DVD, hard disk, flash, U disk, CF card, SD card, MMC card, SM card, Memory Stick, xD card, etc.

In addition, the method for updating contact information provided in the various embodiments may be applied to NAND flash-based storage media, e.g., U disk, CF card, SD card, SDHC card, MMC card, SM card, memory stick, xD card, etc.

According to the various embodiments, the contact information field determination condition is set, A short message is received and analyzed and, when it is determined that the short message contains a field that meets the contact information field determination condition, the field is extracted from the short message. The field is used to update the contact information of the contact. In view of the foregoing, the various embodiments display a method of rapidly updating contact information and display extracting contact information such as a mobile phone number or an e-mail address from the short message, and automatically update or add it to the address book so as to improve the information processing efficiency.

The various embodiments may be applied to various terminals, and the various embodiments may be used across platforms or across terminals; thus, it is widely applicable.

Figure 5:
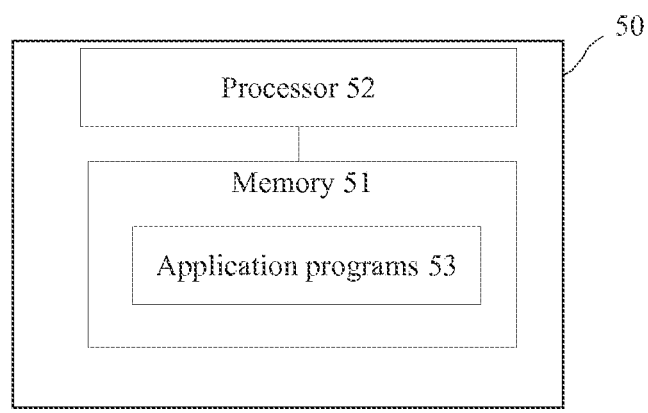
FIG. 5 shows a diagram of an apparatus for updating contact information according to various embodiments.

As shown in FIG. 5, the present disclosure provides an apparatus 50 for updating contact information. The apparatus includes a memory 51, one or more processors 52, and one or more application programs 53 stored in the memory 51 and configured for execution by the one or more processors 52. The one or more programs 53 may include instructions to receive a short message and determine whether a field that meets the contact information field determination condition is contained in the short message. The field is extracted from the short message, and contact information of a contact by using the field is updated.

One or more programs may include instructions to set an e-mail address determination condition, determine that the field that meets the e-mail address determination condition is contained in the short message, extract an e-mail address from the short message, and establish a new contact in an address book and add the e-mail address to contact information of the newly added contact, or update contact information of a sender who sends the short message in the address book according to the e-mail address.

One or more programs may include instructions to set a mobile phone number determination condition, determine that the field that meets the mobile phone number determination condition is contained in the short message, extract a mobile phone number from the short message, and establish a new contact in an address book and add the mobile phone number to contact information of the newly added contact, or update contact information of a sender who sends the short message in the address book according to the mobile phone number.

One or more programs may include instructions to set a fixed telephone number determination condition, determine that the field that meets the fixed telephone number determination condition is contained in the short message, extract a fixed telephone number from the short message, and establish a new contact in an address book and add the fixed telephone number to contact information of the newly added contact, or update contact information of a sender who sends the short message in the address book according to the fixed telephone number.

One or more programs may include instructions to set an instant messenger number determination condition, determine that the field that meets the instant messenger number determination condition is contained in the short message, extract an instant messenger number from the short message, and establish a new contact in an address book and add the instant messenger number to contact information of the newly added contact, or update contact information of a sender who sends the short message in the address book according to the instant messenger number.

One or more programs may include instructions to receive the short message via a data message channel or a wireless message channel.

Figure 6:
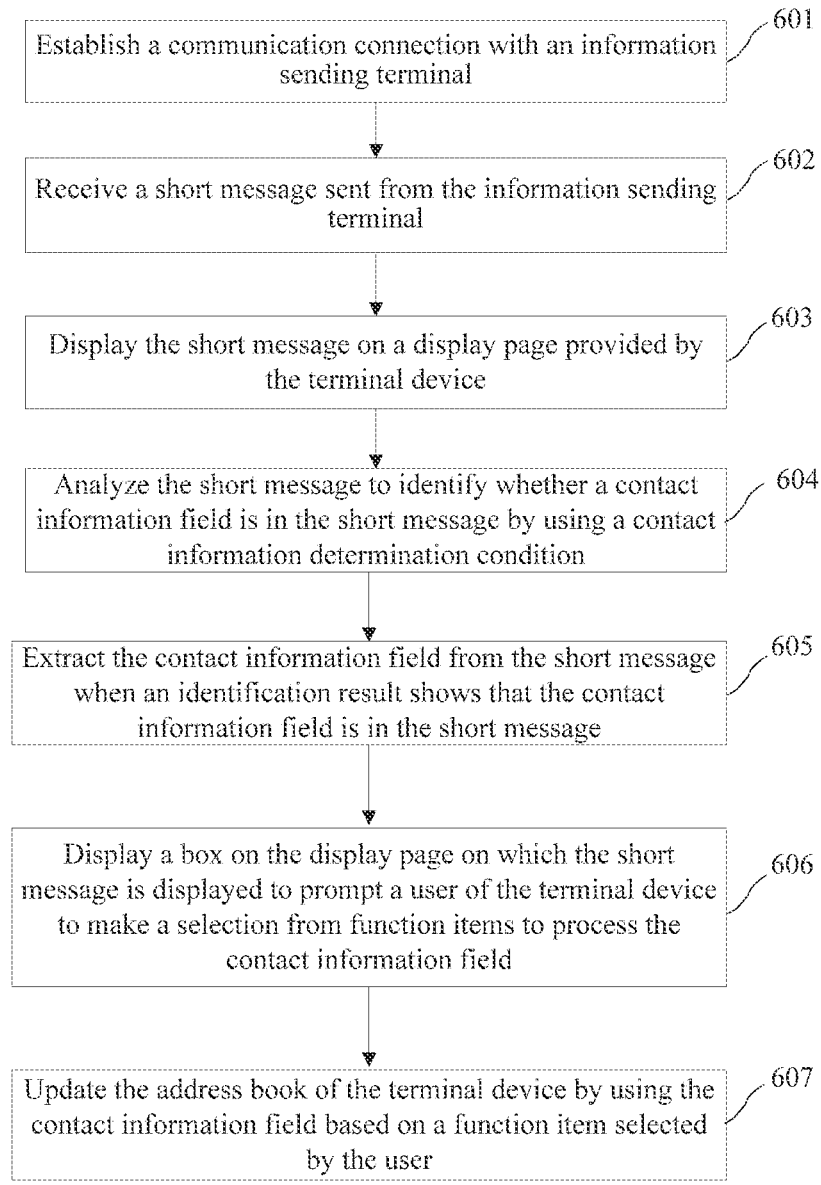
FIG. 6 shows a flow chart of a method for updating contact information according to various embodiments.

FIG. 6 shows a flow chart of a method for updating contact information according to various embodiments. The method is implemented on a terminal device, the terminal device including one or more processors and a storage device on which a program module is stored, the program module being executable by the one or more processors. As shown in FIG. 6, the method may include the following process.

Block 601: a communication connection is established with an information sending terminal.

Block 602: a short message sent from the information sending terminal is received.

Block 603: the short message is displayed on a display page provided by the terminal device.

Block 604: the short message is analyzed to identify whether a contact information field is in the short message by using a contact information determination condition.

Block 605: the contact information field is extracted from the short message when an identification result shows that the contact information field is in the short message.

Block 606: a box is displayed on the display page on which the short message is displayed to prompt a user of the terminal device to make a selection from function items to process the contact information field.

Block 607: the address book of the terminal device is updated by using the contact information field based on a function item selected by the user.

Prior to block 601, the contact information determination condition is set.

The function items may at least include updating the address book and newly adding a contact. When the address book of the terminal device is updated by using the contact information field at block 607, contact information of the information sending terminal may be replaced with the extracted contact information field. When the address book of the terminal device is updated by using the contact information field at block 607, a contact corresponding to the information sending terminal may be newly added into the address book, and contact information of the contact may be established by using the extracted contact information field.

The function items may further include ignoring the contact information field.

When identifying whether the contact information field is in the short message by using the contact information determination condition at block 604, the method may include a process of identifying whether a character string in an e-mail format is in the short message and determining that an e-mail address is in the short message when the character string in the e-mail format is in the short message.

When identifying whether the contact information field is in the short message by using the contact information determination condition at block 604, the method may include a process of identifying whether a number combination is in the short message, detecting whether a length of the number combination is the same with a telephone number length when the number combination is in the short message, wherein the telephone number length comprises a mobile phone number length and a fixed telephone number length, and determining that a telephone number is in the short message when the length of the number combination is the same with the telephone number length.

When identifying whether the contact information field is in the short message by using the contact information determination condition, the method may include a process of identifying whether a number combination is in the short message, detecting whether a length of the number combination is the same with an instant messaging number length when the number combination is in the short message, and determining that an instant messaging number is in the short message when the length of the number combination is the same with the instant messaging number length.

In the method shown in FIG. 6, the information sending terminal may edit the short message and inquire an information processing capability of the terminal device. The information sending terminal may automatically select an information channel according to the information processing capability of the terminal device. The information sending terminal sends the short message to the terminal device via the selected information channel.

The information sending terminal may select the information channel according to an online state of the terminal device, a network state of the terminal device, or a resource processing capability of the terminal device.

Figure 7:
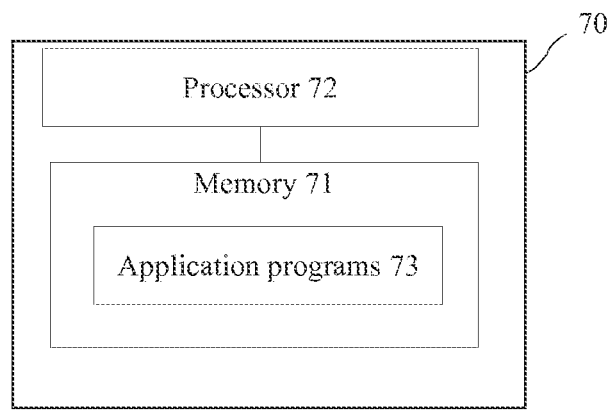
FIG. 7 shows a diagram of an apparatus for updating contact information according to various embodiments.

FIG. 7 shows a diagram of an apparatus for updating contact information according to various embodiments. The apparatus may be: a feature phone, an intelligent mobile phone, a palm PC, a PC, a tablet PC, a PDA, etc. As shown in FIG. 7, the apparatus 70 may include a memory 71, one or more processors 72, and one or more programs 73 stored in the memory 71 and configured for execution by the one or more processors 72. The one or more programs 73 may include instructions to: establish a communication connection with an information sending terminal, receive a short message sent from the information sending terminal, display the short message on a display page provided by the apparatus, analyze the short message to identify whether a contact information field is in the short message by using a contact information determination condition, extract the contact information field from the short message when an identification result shows that the contact information field is in the short message, display a box on the display page on which the short message is displayed to prompt a user of the apparatus to make a selection from function items to process the contact information field, and update the address book of the apparatus by using the contact information field based on a function item selected by the user.

The one or more programs 73 may include an instruction to, prior to establishing the communication connection with the information sending terminal, set the contact information determination condition.

The function items may at least include updating the address book and newly adding a contact.

An instruction to update the address book of the apparatus by using the contact information field may include an instruction to replace contact information of the information sending terminal with the extracted contact information field. An instruction to update the address book of the apparatus by using the contact information field may include an instruction to newly add a contact corresponding to the information sending terminal into the address book and establish contact information of the contact by using the extracted contact information field.

The function items may include ignoring the contact information field.

An instruction to identify whether the contact information field is in the short message by using the contact information determination condition may include instructions to identify whether a character string in an e-mail format is in the short message and determine an e-mail address is in the short message when the character string in the e-mail format is in the short message. An instruction to identify whether the contact information field is in the short message by using the contact information determination condition may include instructions to identify whether a number combination is in the short message, detect whether a length of the number combination is the same with a telephone number length when the number combination is in the short message, wherein the telephone number length includes a mobile phone number length and a fixed telephone number length, and determine that a telephone number is in the short message when the length of the number combination is the same with the telephone number length. An instruction to identify whether the contact information field is in the short message by using the contact information determination condition may include instructions to identify whether a number combination is in the short message, detect whether a length of the number combination is the same with an instant messaging number length when the number combination is in the short message, and determine that an instant messaging number is in the short message when the length of the number combination is the same with the instant messaging number length.

Figure 8:
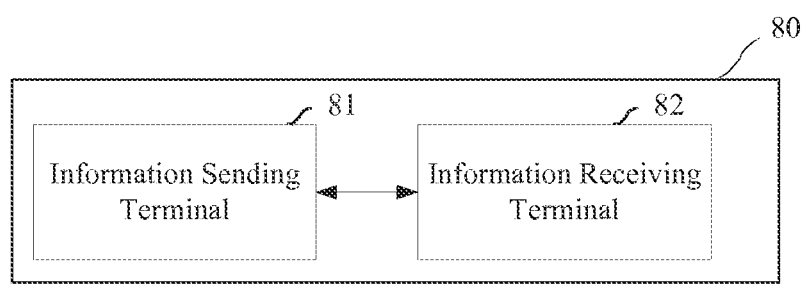
FIG. 8 shows a diagram of a system for updating contact information according to various embodiments.

FIG. 8 shows a diagram of a system for updating contact information according to various embodiments. As shown in FIG. 8, the system 80 includes an information sending terminal 81 and an information receiving terminal 82. The information sending terminal 81 is to send a short message and the information receiving terminal 82 is to establish a communication connection with the information sending terminal 81, receive the short message sent from the information sending terminal 81, display the short message on a display page, analyze the short message to identify whether a contact information field is in the short message by using a contact information determination condition, extract the contact information field from the short message when an identification result shows that the contact information field is in the short message, display a box on the display page on which the short message is displayed to prompt a user of the information receiving terminal 82 to make a selection from function items to process the contact information field, update the address book of the information receiving terminal 82 by using the contact information field based on a function item selected by the user.

The information sending terminal 81 may inquire an information processing capability of the information receiving terminal 82, automatically select an information channel according to the information processing capability of the information receiving terminal 82, and send the short message to the information receiving terminal 82 according to the selected information channel. The information sending terminal 81 is to select the information channel according to an online state of the information receiving terminal 82; select the information channel according to a network state of the information receiving terminal 82; or select the information channel according to a self-state decided by a resource processing capability of the information receiving terminal 82. For example, the information receiving terminal 81 or the information sending terminal 82 may be a feature phone, an intelligent mobile phone, a palm PC, a PC, a tablet PC, a PDA, etc.

The specific examples described above have been shown, and it should be understood that many variations and modifications may be made to these various embodiments without departing substantially from the spirit and principle of the present disclosure. All such modifications and variations are intended to be included within the scope of the present disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

What is claimed is:

1. A method for updating contact information in an address book, implemented on a terminal device, the terminal device comprising one or more processors and a storage device on which one or more program modules are stored, the one or more program modules being executable by the one or more processors, the method comprising:

establishing a communication connection with an information sending terminal;

receiving a short message sent from the information sending terminal;

displaying the short message on a display page provided by the terminal device;

analyzing the short message to identify whether a contact information field is in the short message by using a contact information determination condition;

extracting the contact information field from the short message when an identification result shows that the contact information field is in the short message;

displaying a box on the display page on which the short message is displayed to prompt a user of the terminal device to make a selection from function items to process the contact information field; and updating the address book of the terminal device by using the contact information field based on a function item selected by the user;

wherein identifying whether the contact information field is in the short message by using the contact information determination condition comprises:

identifying whether a number combination is in the short message;

detecting whether a length of the number combination is the same with a telephone number length when the number combination is in the short message, wherein the telephone number length comprises a mobile phone number length and a fixed telephone number length; and determining that a telephone number is in the short message when the length of the number combination is the same with the telephone number length.

2. The contact information updating method according to claim 1, wherein prior to establishing the communication connection with the information sending terminal, the method further comprises:

setting the contact information determination condition.

3. The contact information updating method according to claim 1, wherein the function items at least comprise updating the address book and newly adding a contact.

4. The contact information updating method according to claim 3, wherein updating the address book of the terminal device by using the contact information field comprises:

replacing contact information of the information sending terminal with the extracted contact information field.

5. The contact information updating method according to claim 3, wherein updating the address book of the terminal device by using the contact information field comprises:

newly adding a contact corresponding to the information sending terminal into the address book, and establishing contact information of the contact by using the extracted contact information field.

6. The contact information updating method according to claim 3, wherein the function items comprise ignoring the contact information field.

7. The contact information updating method according to claim 1, wherein identifying whether the contact information field is in the short message by using the contact information determination condition comprises:

identifying whether a character string in an e-mail format is in the short message; and determining an e-mail address is in the short message when the character string in the e-mail format is in the short message.

8. The contact information updating method according to claim 1, wherein identifying whether the contact information field is in the short message by using the contact information determination condition further comprises:

detecting whether the length of the number combination is the same with an instant messaging number length when the number combination is in the short message; and determining that an instant messaging number is in the short message when the length of the number combination is the same with the instant messaging number length.

9. The contact information updating method according to claim 1, wherein the method further comprises:

the information sending terminal editing the short message and inquiring an information processing capability of the terminal device;

the information sending terminal automatically selecting an information channel according to the information processing capability of the terminal device; and the information sending terminal sending the short message to the terminal device via the selected information channel.

10. The contact information updating method according to claim 9, wherein the information sending terminal automatically selecting the information channel according to the information processing capability of the terminal device comprises:

the information sending terminal selecting the information channel according to an online state of the terminal device; or the information sending terminal selecting the information channel according to a network state of the terminal device; or the information sending terminal selecting the information channel according to a resource processing capability of the terminal device.

11. An apparatus for updating contact information, comprising memory;

one or more processors; and one or more programs stored in the memory and configured for execution by the one or more processors, the one or more programs comprising instructions to:

establish a communication connection with an information sending terminal;

receive a short message sent from the information sending terminal;

display the short message on a display page provided by the apparatus;

analyze the short message to identify whether a contact information field is in the short message by using a contact information determination condition;

extract the contact information field from the short message when an identification result shows that the contact information field is in the short message;

display a box on the display page on which the short message is displayed to prompt a user of the apparatus to make a selection from function items to process the contact information field; and update the address book of the apparatus by using the contact information field based on a function item selected by the user, wherein an instruction to identify whether the contact information field is in the short message by using the contact information determination condition comprises instructions to:

identify whether a number combination is in the short message;

detect whether a length of the number combination is the same with a telephone number length when the number combination is in the short message, wherein the telephone number length comprises a mobile phone number length and a fixed telephone number length; and determine that a telephone number is in the short message when the length of the number combination is the same with the telephone number length.

12. The apparatus according to claim 11, wherein the one or more programs comprise an instruction to:

prior to establishing the communication connection with the information sending terminal, set the contact information determination condition.

13. The apparatus according to claim 11, wherein the function items at least comprise updating the address book and newly adding a contact.

14. The apparatus according to claim 13, wherein an instruction to update the address book of the apparatus by using the contact information field comprises an instruction to:
   replace contact information of the information sending terminal with the extracted contact information field.

15. The apparatus according to claim 13, wherein an instruction to update the address book of the apparatus by using the contact information field comprises an instruction to:
   newly add a contact corresponding to the information sending terminal into the address book, and establish contact information of the contact by using the extracted contact information field.

16. The apparatus according to claim 13, wherein the function items comprise ignoring the contact information field.

17. The apparatus according to claim 11, wherein an instruction to identify whether the contact information field is in the short message by using the contact information determination condition comprises instructions to:
   identify whether a character string in an e-mail format is in the short message; and
   determine an e-mail address is in the short message when the character string in the e-mail format is in the short message.

18. The apparatus according to claim 11, wherein an instruction to identify whether the contact information field is in the short message by using the contact information determination condition further comprises instructions to:
   detect whether the length of the number combination is the same with an instant messaging number length when the number combination is in the short message; and
   determine that an instant messaging number is in the short message when the length of the number combination is the same with the instant messaging number length.

19. A system for updating contact information, comprising: an information sending terminal and an information receiving terminal, wherein
   the information sending terminal is to send a short message; and
   the information receiving terminal is to:
   establish a communication connection with the information sending terminal;
   receive the short message sent from the information sending terminal;
   display the short message on a display page;
   analyze the short message to identify whether a contact information field is in the short message by using a contact information determination condition;
   extract the contact information field from the short message when an identification result shows that the contact information field is in the short message;
   display a box on the display page on which the short message is displayed to prompt a user of the information receiving terminal to make a selection from function items to process the contact information field; and
   update the address book of the information receiving terminal by using the contact information field based on a function item selected by the user;
   wherein
   the information sending terminal is to inquire an information processing capability of the information receiving terminal, automatically select an information channel according to the information processing capability of the information receiving terminal, and send the short message to the information receiving terminal according to the selected information channel.

20. The system according to claim 19, wherein
   the information sending terminal is to select the information channel according to an online state of the information receiving terminal; or select the information channel according to a network state of the information receiving terminal; or select the information channel according to a self-state decided by a resource processing capability of the information receiving terminal.

* * * * *